June 17, 1930.  W. R. MITTENDORF  1,764,275
COUNTING SCALE
Filed Oct. 9, 1923  2 Sheets-Sheet 1
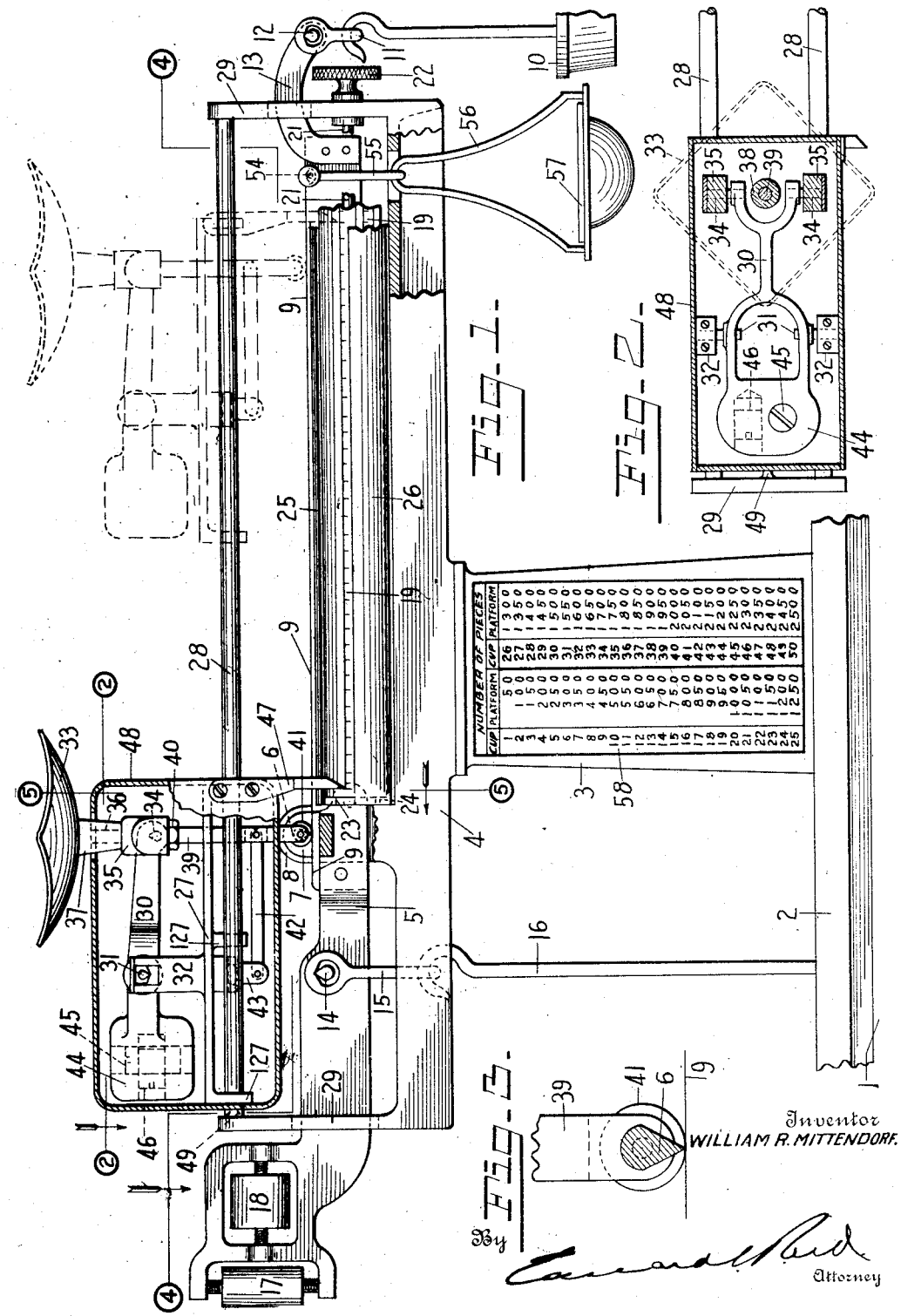
Inventor
WILLIAM R. MITTENDORF.

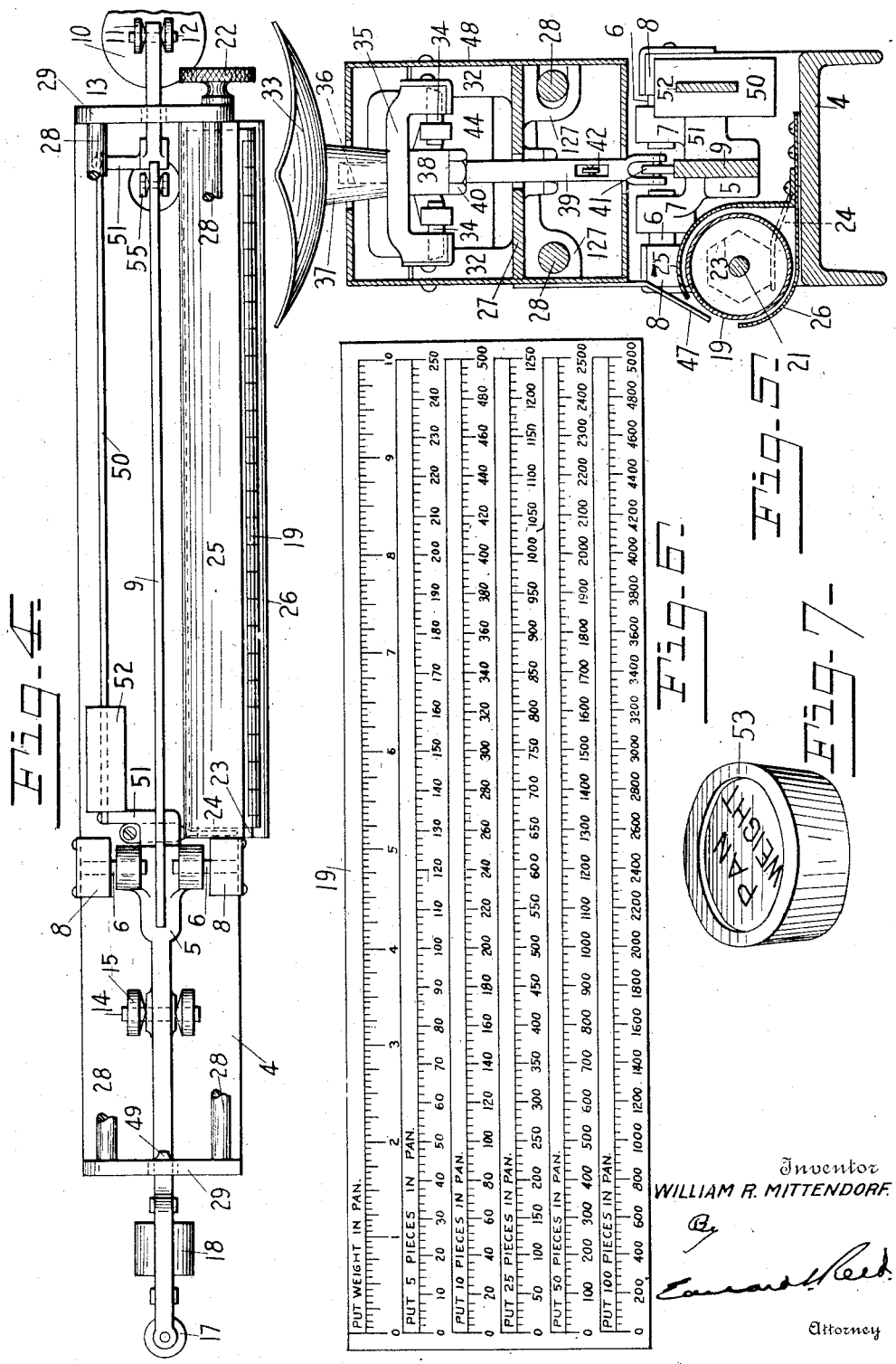

Patented June 17, 1930

1,764,275

UNITED STATES PATENT OFFICE

WILLIAM R. MITTENDORF, OF CINCINNATI, OHIO, ASSIGNOR, BY MESNE ASSIGNMENTS, TO INTERNATIONAL BUSINESS MACHINES CORPORATION, OF NEW YORK, N. Y., A CORPORATION OF NEW YORK

COUNTING SCALE

Application filed October 9, 1923. Serial No. 667,511.

This invention relates to counting scales and more particularly to a counting scale of the type known as the beam scale. In this type of scale the unit of parts to be counted constitutes a counterbalance for the mass of parts on the load platform, the gravitational force of said unit being applied to the beam in such a manner as to constitute in effect a poise the position of which on the beam is significant of the number of units comprising the load on the platform of the scale.

In the beam type of counting scale it has heretofore been customary to support the unit receptacle from the beam of the scale in such a manner that it could be adjusted lengthwise thereof. Obviously with such a construction it is necessary that the weight of the unit receptacle and the parts by means of which it is supported on the beam must be neutralized or counterbalanced in any position to which it may be adjusted on the beam, so that the counterbalance for the load on the platform of the scale will consist of nothing but the unit itself. The neutralization of the weight of the unit receptacle and its associated parts has been usually accomplished by mounting on the beam a weight equal to the weight of the unit receptacle and its associated parts and so connecting the same with the unit receptacle that they will be moved simultaneously equal distances in opposite directions. With such mechanism there is a fundamental requirement that the unit receptacle be connected in some manner to the counterbalancing weight therefor, so that as the unit receptacle is moved a certain distance on the beam to effect a balance of the scale the weight must be moved an equal distance in the opposite direction. In some forms of scale the unit receptacle and its carriage have been connected with the counterbalancing weight by means of a belt or cable extending about horizontal pulleys near the opposite ends of the beam. In other scales right and left hand screws have been mounted on the beam for simultaneously adjusting the weight and the unit receptacle in opposite directions. It is essential that the adjustment of the counterbalancing weight in relation to the unit receptacle shall be absolutely correct in order that the computation may be accurate. Consequently the several parts of the mechanism must be in absolute balance and must be maintained in such balance. The belt pulleys must be in accurate balance around their axes and the belt itself must be of uniform specific gravity throughout its length. Much difficulty is experienced in securing and maintaining these accurate conditions which are essential to the accurate operation of the scale.

Further, it is necessary to adjust the unit receptacle, or the carriage which supports the same on the beam, along the beam to balance the load on the platform. Inasmuch as the touch of the hand on the carriage will affect the balance it is necessary to move the carriage into what appears to be an approximately correct position, release the same and observe its action and then adjust it again and again until finally an exact balance is had. This process is slow and tedious as it usually requires several adjustments of the carriage before the balance is secured.

One object of the present invention is to provide a counting scale of the beam type in which the beam may be subjected to the weight of the unit and in any selected position along its length without the use of the counterbalancing weights and their associated parts as above described.

A further object of the invention is to provide a scale of this type in which the beam will be subjected only to the weight of the unit and not to the weight of the unit receptacle and its associated parts.

A further object of the invention is to provide a scale of this kind with means for adjusting the unit receptacle along the beam which is of such a character that the grasp of the hand may be maintained thereon at all times during the adjustment of the receptacle without affecting the balance of the beam.

A further object of the invention is to provide a counting scale of this type which will be simple in its construction, accurate in its operation and which may be maintained in a correctly operative condition with little or no trouble.

Other objects of the invention will appear as the device is described in detail.

In the accompanying drawings Fig. 1 is a side elevation, partly in section, of a mechanism embodying my invention; Fig. 2 is a plan view of the unit receptacle and its carriage, with the casing in section; Fig. 3 is a diagrammatic detail showing the position of the axis of the beam with relation to the member which connects the unit receptacle with the beam; Fig. 4 is a section taken on line 4—4 of Fig. 1; Fig. 5 is a section taken on the line 5—5 of Fig. 1; Fig. 6 is a diagrammatic lay-out of the computing chart; and Fig. 7 is one of the pan weights used for determining the weight of the load.

In these drawings I have illustrated one embodiment of my invention but it will be understood that the particular construction shown has been chosen for the purpose of illustration only and that the invention may be applied to beam scales of various kinds and that the mechanism itself may take various forms without departing from the spirit of the invention.

In carrying out my invention I provide means for supporting a unit receptacle adjacent to but independently of the scale beam. The weight of the unit receptacle is neutralized so that it may be said to float and will in itself impose no load upon the beam but the arrangement is such that the weight of a unit placed within the receptacle will be imposed upon the beam. The unit receptacle is so mounted that it may be adjusted to any position along the beam, thereby utilizing the weight of the unit to counterbalance the load on the load platform. A stationary indicating member or chart is arranged along the beam and a second indicating member or pointer is connected with the unit receptacle so that it will cooperate with the chart to indicate the number of parts on the load platform. The unit receptacle is mounted on a carriage which is supported on the scale structure for movement lengthwise of the beam but the unit receptacle is so mounted on the carriage that it is freely movable relatively thereto and any force or pressure applied to the carriage will not affect the unit receptacle or in any way interfere with the balancing of the beam when the unit receptacle is properly positioned with relation thereto, thus enabling the operator to grasp the carriage and move the unit receptacle slowly but continuously to a position in which the load on the platform will be balanced and equilibrium established.

As has been stated the mechanism by means of which the desired results are accomplished may take various forms but, as here shown, the scale as a whole comprises a base 1 having a load platform 2 and having an upright standard 3 the upper end of which is secured to a bracket or supporting frame 4 the end portions of which, in the present instance, extend laterally beyond the respective sides of the standard 3. The weigh beam comprises a member 5 which is pivotally mounted on the frame 4, preferably by means of knife edge pivots, these extending laterally therefrom and engaging the usual V bearings 7, which are carried by standards 8 on the main frame. Rigidly secured to the member 5 is a bar 9 which constitutes the beam proper and the upper surface of which is arranged in a plane extending through the axis of the beam, that is, a plane upon which the knife edge pivots will rest. The beam is provided at its outer or right hand end with the usual counterpoise 10 which may also serve as a holder for loose weights when these are required. This counterpoise is here shown as supported by a stirrup 11 having V bearings to engage knife edge pivots 12 extending from the opposite sides of the goose neck 13 which is rigidly secured to the adjacent end of the beam or bar 9. The beam may be operatively connected with the load platform or receptacle in any suitable manner. As here shown, the member 5 is provided on that side of its axis opposite the bar 9 with knife edge pivots 14 which engage bearings in the respective arms of a stirrup 15 arranged to receive the hook of the draft rod 16, the lower end of which is connected with the load platform either directly or through suitable intermediate mechanism. The member 5 extends beyond the left hand end of the frame member 4 and is provided with balance balls or weights 17 and 18 adjustable along intersecting lines to balance the beam and its connected parts.

Associated with the beam but mounted independently thereof and extending lengthwise thereof is a computing chart 19 which may have one or any desired number of series of graduations thereon. When more than one series of computations are placed upon the chart it is preferably so mounted that only one series will be visible at one time and is made adjustable so that any desired series of computations may be moved into reading position. In the present instance the chart comprises six series of figures representing computations which may be effected by the scale. In Fig. 6 I have shown the chart in a flat position but in use I prefer that it should be in the form of a cylinder, as shown in Fig. 5. As shown in Fig. 6, the upper series of graduations represent pounds and ounces and are used for the purpose of computing the weight of the load on the load platform. The other five series of graduations represent the number of parts on the load platform when units consisting of different numbers of articles are in the unit receptacle, and each series is marked to indicate the number of parts constituting the unit for that series of graduations, the several series being adapted, in the present instance, for computing with units of 5, 10, 25, 50 and 100, articles respectively. The chart when arranged in cylindrical form, as shown in Fig. 5, is mounted on a shaft 21 which is journaled at its ends in bearings carried by the frame member 4 and is provided at one end with a knob or handle 22 by means of which it may be rotated. Rigidly secured to the shaft, at one end thereof, is a hexagonal disk 23 the flat portions of which are engaged by a spring 24 which tends to hold the chart in its adjusted positions but permits the same to be rotated to bring any desired series of graduations into reading position. The cylindrical chart is mounted within a suitable casing which, as here shown, consists of two plates 25 and 26 secured to suitable stationary parts of the main frame, extending partially about the cylindrical chart and having their adjacent edges spaced apart to form a sight opening through which the chart may be read. The chart and sight opening are so arranged that when the chart is in any one of its adjusted positions a single series of graduations on the chart will be visible through the opening.

The unit receptacle is mounted for movement lengthwise of the beam but is supported independently thereof and the weight of the unit receptacle and its associated parts is neutralized so that the unit receptacle when empty will impose no load upon the beam and when a unit is placed in the receptacle the beam will be subjected to the weight of the unit alone. In that form of the mechanism here shown, a carriage 27 is mounted for movement lengthwise of the beam, it being, in the present instance, slidably mounted on a pair of rods 28 arranged above and extending lengthwise of the beam and supported at their ends in upright arms 29 carried by and forming a part of the frame 4. To this end the carriage is provided with a series of lugs 127 apertured to receive the rods 28. A lever 30 is pivotally mounted on this frame and, as here shown, is provided at a point between its ends with knife edge pivots 31 which engage bearings carried by standards 32 extending upwardly from the carriage 27. The unit receptacle 33 is pivotally mounted on one end of the lever 30 and to this end the lever 30 may be provided with knife edge pivots 34 to engage bearings in a supporting member 35 having a stud 36 adapted to enter a socket in a part 37 depending from and rigidly secured to the unit receptacle 33. The supporting member 35 is also provided with a depending socket member 38 which, in the present instance, is screw threaded to receive the upper end of a rod 39 which is rigidly secured in adjusted positions therein by means of a lock nut 40. The lower end of the rod 39 is bifurcated and has mounted therein a roller 41 arranged to engage the upper edge of the bar 9 of the beam structure. This roller is so mounted that when in its fully retracted or normal position it will engage the bar 9 on a line coincident with the axis of that bar and will, therefore, not influence the movements of the bar. To maintain the rod 39 and the unit receptacle in their normal upright positions a check link 42 is connected at one end with the rod 39 and at the other end with a fixed projection 43 depending from the carriage. That end of the lever 30 opposite the unit receptacle is provided with an enlarged portion or weight 44 to counterbalance the weight of the unit receptacle and its associated parts and thus neutralize the weight of these parts so that no weight will be imposed upon the beam by the contact of the roller 41 therewith when the unit receptacle is empty. Preferably the weight 44 is provided with screw threaded plugs 45 and 46 arranged along intersecting lines and by means of which the weight may be adjusted to accurately counterbalance the unit receptacle and its associated parts. An indicating member such as a pointer 47 is associated with the unit receptacle for movement therewith along the beam and, in the present instance is rigidly secured to the carriage 27. This indicating member or pointer is so arranged with relation to the unit receptacle that when the latter is in its retracted or neutral position the pointer will indicate the zero indication on the chart 20. The carriage 27 and parts mounted thereon are preferably enclosed in a casing 48 having openings in its upper and lower walls to permit the passage of the stem 37 of the unit receptacle and of the lower end of the rod 39. Preferably a stop is provided to accurately locate the carriage in its neutral position when it is retracted and, in the present instance, such a stop is shown at 49, as mounted on the left hand end member 29 of the frame 4. If desired, the scale may be provided with a tare beam for taking care of the weight of a receptacle containing the load to be weighed and such a beam is shown at 50 as rigidly mounted on laterally extending arms 51 carried by the main beam structure and is provided with a tare poise 52.

The operation of the scale will be readily understood from the foregoing description thereof and it will be apparent that when it is desired to determine the number of parts of an unknown quantity, a mass or lot of parts is placed on the load platform or receptacle of the scale. The carriage for the unit receptacle is then moved to its outermost position, in the present instance, the right hand end of the frame 4, and a unit consisting of the desired number of parts, in the present instance either 5, 10, 25, 50 or a 100, is placed in the unit receptacle. The selection of the number of parts which are to constitute the unit is determined by the number necessary to force the beam 9 to its lowermost position but the unit must consist of a number of parts corresponding to the unit indication associated with one of the series of computing graduations. When a unit of sufficient weight to force the beam to its lowermost position has been placed in the unit receptacle the carriage, together with the unit receptacle, is then moved inward toward its neutral position, that is, to the left in the present drawings, until the beam is balanced. The computing cylinder is turned to bring into line with the reading opening that series of graduations corresponding to the number of pieces constituting the unit which has been placed in the unit receptacle and the indicating member or pointer 47 will then indicate on the exposed series of graduations on the chart the number of pieces comprising the load.

When it is desired to count out some predetermined number of parts the computing cylinder or chart is turned to a reading position in which the desired number appears in a position furthest to the right and a unit consisting of a corresponding number of parts is placed in the unit receptacle. The unit receptacle and carriage are then moved outward to a position in which the indicator 43 registers with the desired number of parts on the chart and the mass of parts are then poured into the load receptacle until a balance is obtained, which will result when the desired number of parts are in the load receptacle.

When it is desired to determine the weight of some particular load the computing cylinder is turned to bring the series of weight graduations into reading position. A pan weight, as shown at 53 in Fig. 7, is placed in the unit receptacle and the carriage moved to a position in which a balance is obtained. The indicating member or pointer 47 will then register on the chart the weight of the load, provided the same is within the scope of weight graduations which, in the present instance, is ten pounds. If the load is greater than the scope of the weight graduations it is necessary to use loose weights on the counterpoise 10 in the usual manner, the carriage being shifted to obtain the balance and the total weight being found by adding the total of the weights on the counterpoise to the amount indicated on the chart.

It will be apparent that the weigh beam does not carry the unit receptacle or any of the mechanism associated therewith and it is therefore unnecessary to provide delicately adjusted counterbalancing mechanism on the beam for the unit receptacle, as the latter is so mounted that the beam will be subjected to a load only when a unit is placed in the unit receptacle and the carriage is shifted to move the unit receptacle outward from its neutral position. Further, the carriage for the unit receptacle being mounted on a stationary support independent of the beam it will be obvious that the operator may grasp this carriage to shift the receptacle to a position in which the unit in the receptacle will balance the beam and that he may retain his grip on the carriage at all times during the balancing operation as it does not in any way affect the movement of the beam or of the unit receptacle. In this manner a balance may be effected much more easily and in much shorter time than can be done where it is necessary to release the grip on the unit receptacle or its supporting structure each time the same has been moved to a tentative position.

In counting scales of the beam type as heretofore constructed the direct computing capacity was for the most part limited to the largest number which could be computed on that series of graduations having the highest unit of value, that is, if the position of the carriage furthest from the fulcrum of the beam gave a ratio between the unit and the load of, say 50 to 1, and the highest unit value series of graduations was for 100 pieces comprising the unit then the maximum count for a single operation was 5000 pieces. If it was desired to count out a quantity larger than 5000, and providing the weight of such quantity did not exceed the load capacity of the scale, or where it was desired to determine the number of pieces in a lot which contained more than 5000 pieces it was necessary either to split up the lot into smaller quantities and count each separately and then add the various counts to get the total number of pieces, or increase the number of pieces comprising the unit say, for example, to 200 or 300 pieces or as many more as may be necessary and to then take the reading from the 100 series of graduations on the beam and multiply the same by 2 or 3 or whatever number of times the original unit of 100 pieces had been increased. Both these methods were objectionable. The first was inefficient because it required too much time and involved a computation on the part of the operator with the corresponding likelihood to error; the second also involved a computation on the part of the operator and, further, a considerable error might arise due to the very high value of the unit. Inasmuch as the unit contained a very large number of pieces the count could not be accurately indicated, as each graduation on the beam would represent 200 or 300 pieces, as the case might be, and if the indication was between two graduations the error might be very large. To overcome this disadvantage and to provide means for accurately counting a large number of parts I have provided the beam with a second or fixed ratio unit receptacle. This second unit receptacle is mounted on the beam at a fixed point and, as here shown, the beam is provided near its right hand end with knife edge pivot pins 54 on which is mounted a stirrup 55 from which in turn is suspended a carrier or holder 56 in which is mounted a unit receptacle 57. The second unit receptacle is mounted on the beam in such location relative to the fulcrum of the beam that the ratio between the second unit receptacle and the load platform of the scale will be of desirable and even multiplication such, for example, as 50 to 1. In the use of this fixed ratio unit receptacle when it is desired to determine the number of parts in a lot of unknown quantity the lot of parts is placed on the load platform of the scale, the unit receptacle carriage 27 is then moved to its extreme outer or right hand position and there is placed in the unit receptacle a number of parts sufficient to force the beam to its lowermost position, the number of parts in the unit receptacle corresponding to the unit upon which one series of computations on the chart is based, that is, in the present instance, either 5, 10, 25, 50 or a 100 parts, but in the present instance, since there are more than 5000 pieces in the lot to be counted the beam would not go down even with 100 pieces in the unit receptacle, therefore the operator drops parts into the fixed ratio unit receptacle 57 until he has put into the same a sufficient number to cause the beam to move to its lowermost position, the parts being counted as they are placed in the fixed ratio unit receptacle. When the beam has moved to its lowermost position the carriage is moved toward the left gradually until a balance is obtained. The computing cylinder is then turned to bring the series of graduations corresponding to the number of parts constituting the unit in the adjustable unit receptacle, which, in this instance is 100, into reading position and the indicating member or pointer 47 will then denote on the chart the number of parts of the load which are counterbalanced by the 100 pieces in the receptacle 28. If, for example, the operator has placed 46 pieces in the fixed ratio unit receptacle 57 this number will counterbalance 50 times that many parts, or 2300 parts on the load platform, this computation being preferably arranged on a wall chart mounted on or adjacent to the scale. If the indicating member 47 which is connected with the adjustable unit receptacle indicates, for example, 4860 pieces, then the total number of pieces in the lot is 2300 plus 4860 or 7160 pieces.

When it is desired to count out some particular number of parts in excess of 5000, say for example, 6820, the operator will subtract from the total number of parts desired an amount sufficient to leave a remainder slightly less than 5000 which is the maximum capacity of the chart in the 100 series of graduations. By subtracting 2000 from the 6820 a remainder of 4820 would be left. By reference to the wall chart 53 in Fig. 1 it will be seen that 40 pieces in the fixed ratio unit receptacle equals 2000 pieces on the platform, and therefore, the operator would place 40 pieces in the fixed ratio unit receptacle. The computing chart is then turned to bring the 100 series of graduations into reading position, and 100 parts are then placed in the adjustable unit receptacle and the carriage is moved into a position in which the indicator 43 registers with the graduation signifying 4820 parts. A sufficient number of parts is then placed on the platform to balance the scale and the mass so placed on the load platform will comprise the number desired, that is, 6820. If it is desired to count out a number of parts which is evenly divisible by 50, the ratio of the fixed ratio unit receptacle in the present case, it is not necessary to use the adjustable receptacle and computing chart as it is only necessary that the operator shall place in the fixed ratio unit receptacle the correct number of parts to obtain the number desired, as shown on the wall chart, and when a sufficient number of parts have been placed on the load platform to balance the scale the load will contain the desired number of parts.

The operation of the scale will be readily understood from the foregoing description and it will be apparent that the scale will operate with extreme accuracy and that even in those computations where the operator is required to make certain calculations these are of simple character, easily made and are not likely to result in inaccuracies. With this construction not only is greater accuracy obtained but time is saved as the operations are simple and it is not necessary to count by hand as many articles as is the case with other counting scales of the beam type.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent, is:

1. In a scale, a beam, a computing chart supported adjacent to but independently of said beam, a unit receptacle adjustable lengthwise of said beam and arranged to subject the beam to the weight of a unit in said receptacle, an indicating member supported independently of said unit receptacle and movable with said unit receptacle along said beam and cooperating with said chart, and means supported independently of said beam for adjusting said unit receptacle and said indicating member.

2. In a scale, a beam, a computing chart arranged adjacent to said beam, a unit receptacle supported independently of said beam for movement lengthwise thereof and arranged to subject said beam to the weight of a unit in said receptacle, a supporting device for said unit receptacle, and an indicating member carried by said device and cooperating with said chart.

3. In a scale, a beam, a computing chart supported adjacent to but independently of said beam, a unit receptacle supported independently of said beam for movement lengthwise thereof, a part connected with said receptacle and arranged to act on said beam, said receptacle and said part being counterbalanced so that said beam will be subjected only to the weight of a unit in said unit receptacle, a supporting device for said unit receptacle, and an indicating member carried by said device and cooperating with said chart.

4. In a scale, a beam, a computing chart arranged adjacent to said beam, a unit receptacle supported independently of said beam for movement lengthwise thereof, a part connected with said receptacle and arranged to subject said beam to the weight of a unit in said receptacle, said part being so arranged that when said unit receptacle is in its normal position said part will act on said beam at a point in longitudinal alinement with the axis thereof, a supporting device for said unit receptacle, and an indicating member carried by said device and cooperating with said chart.

5. In a scale, a pivoted beam, a computing chart arranged adjacent to said beam, a unit receptacle supported independently of said beam for movement lengthwise thereof, a part connected with said unit receptacle and adapted to engage said beam and travel over the same when said receptacle is moved lengthwise of said beam, said part being so arranged that when said unit receptacle is in its normal position said part will engage said beam at a point in longitudinal alinement with the axis thereof, means for neutralizing the weight of said unit receptacle and said part so that said beam will be influenced by said part only when there is a unit in said unit receptacle, a supporting device for said unit receptacle, and an indicating member carried by said device and cooperating with said chart.

6. In a scale, a beam, a computing chart arranged adjacent to said beam, a carriage mounted independently of said beam for movement lengthwise thereof, a unit receptacle carried by said carriage, means associated with said unit receptacle to cause said beam to be subjected to the weight of a unit in said receptacle, and an indicating member supported by said carriage independently of said unit receptacle and cooperating with said chart.

7. In a scale, a beam, a computing chart supported adjacent to but independently of said beam, a carriage mounted independently of said beam for movement lengthwise thereof, a unit receptacle mounted on said carriage and arranged to subject said beam to the weight of a unit in said receptacle, means for neutralizing the weight of said unit receptacle, whereby said beam will be subjected only to the weight of the unit in said receptacle, and an indicating member secured to said carriage and cooperating with said chart.

8. In a scale, a beam, a computing chart arranged adjacent to said beam, a carriage mounted independently of said beam for movement lengthwise thereof, a supporting structure pivotally mounted on said carriage on an axis parallel with the axis of said beam, a unit receptacle carried by said structure and having a part arranged to act on said beam, means for counterbalancing said unit receptacle and its associated parts, whereby said part of said unit receptacle will act on said beam only when there is a unit in said receptacle, and an indicating member connected with said carriage and cooperating with said chart.

9. In a scale, a beam, a computing chart arranged adjacent to said beam, a carriage mounted independently of said beam for movement lengthwise thereof, a lever extending lengthwise of said beam and pivotally mounted between its ends on said carriage, a unit receptacle pivotally mounted on one end of said lever, a part connected with said unit receptacle and arranged to engage said beam, means acting on the other end of said lever to counterbalance said unit receptacle and said part, whereby said beam will be subjected only to the weight of a unit in said receptacle, and an indicating member connected with said carriage and cooperating with said chart.

10. In a scale, a beam, a computing chart supported adjacent to but independently of said beam, a carriage mounted independently of said beam for movement lengthwise thereof, a supporting structure pivotally mounted on said carriage, a unit receptacle mounted on said supporting structure, a part connected with said unit receptacle and arranged to engage said beam and travel thereon, means to counterbalance said unit receptacle and its associated parts, and an indicating member connected with said carriage and cooperating with said chart.

11. In a scale, a beam, a computing chart arranged adjacent to said beam, a carriage mounted independently of said beam for movement lengthwise thereof, a lever pivotally mounted between its ends on said carriage, a unit receptacle pivotally mounted on one end of said lever, a rod connected with said unit receptacle, a roller carried by said rod and arranged to travel on said beam when movement is imparted to said carriage, said roller being so arranged that when said carriage is in its normal position said roller will engage said beam at a point in longitudinal alinement with the axis thereof, the other end of said lever being weighted to counterbalance said unit receptacle and its associated parts, and an indicating member connected with said carriage and cooperating with said chart.

12. In a scale, a beam, a computing chart arranged adjacent to said beam, a unit receptacle supported independently of said beam for movement lengthwise thereof, a part connected with said receptacle and arranged to act on said beam, said receptacle and said part being counterbalanced so that said beam will be subjected only to the weight of the unit in said unit receptacle, an indicating member associated with said unit receptacle and cooperating with said chart, said part of said unit receptacle being so arranged that when said unit receptacle is in its normal position the contact portion of said part will be in longitudinal alinement with the axis of said beam.

13. In a scale, a frame, a beam pivotally mounted on said frame, rods mounted on said frame above said beam and extending lengthwise of said beam, a carriage slidably mounted on said rods, a lever pivotally mounted on said carriage on an axis parallel with the axis of said beam, a unit receptacle mounted on said lever, a roller connected with said unit receptacle and arranged to engage said beam, the other end of said lever being weighted to counterbalance said unit receptacle and its associated parts, an indicating member mounted directly on said carriage, and a computing chart supported adjacent to but independently of said beam and cooperating with said indicating member.

14. In a scale, a beam, a computing chart supported adjacent to but independently of said beam, a unit receptacle supported independently of said beam and movable lengthwise thereof, means associated with said unit receptacle to cause said beam to be subjected to the weight of a unit in said receptacle, and an indicating member associated with said unit receptacle and cooperating with said independently mounted chart.

15. In a scale, a beam, a cylindrical computing chart arranged adjacent to said beam and rotatable about a longitudinal axis, said chart having a plurality of series of graduations extending lengthwise thereof, a casing enclosing said cylindrical chart and having a longitudinally extending sight opening with which any one of said series of graduations may register, a unit receptacle having a part arranged to engage said beam and subject the same to the weight of a unit in said receptacle, means to neutralize the weight of said unit receptacle and said part, whereby said beam will be subjected to the weight of a unit only, an indicating member associated with said unit receptacle and movable along the sight opening in said casing, a disk connected with said cylindrical chart and having a flat surface corresponding to each series of indications on said chart, and a detent arranged to engage said flat surfaces to retain said chart in its adjusted positions.

16. In a scale, a pivoted beam having a portion of its upper edge arranged in the plane of its axis, a computing chart arranged adjacent to said beam, a unit receptacle mounted independently of said beam for movement lengthwise thereof, a part connected with said unit receptacle and arranged to engage said upper edge of said beam and travel over the same as said unit receptacle is moved lengthwise of said beam, means for neutralizing the weight of said unit receptacle and said part, whereby said beam will be subjected only to the weight of a unit in said receptacle, and an indicating member associated with said unit receptacle and cooperating with said chart.

17. In a scale, a pivoted beam having a portion of its upper edge arranged in the plane of its axis, a computing chart arranged adjacent to said beam, a unit receptacle mounted independently of said beam for movement lengthwise thereof, a part connected with said unit receptacle and arranged to engage said upper edge of said beam and travel over the same as said unit receptacle is moved lengthwise of said beam, means for neutralizing the weight of said unit receptacle and said part, whereby said beam will be subjected only to the weight of a unit in said receptacle, and an indicating member associated with said unit receptacle and cooperating with said chart, said part being so arranged that when said unit receptacle is in its normal position said part will engage said edge of said beam at a point coincident with the axis of said beam.

18. In a scale comprising a load balance, a unit receptacle arranged to act on said load balance and adjustable to vary the effective ratio of said load balance, cooperating indicating members mounted independently of said load balance for movement with relation thereto, the position of one of said members being determined by said load balance, and a second unit receptacle connected with said load balance.

19. In a scale comprising a load balance, a unit receptacle arranged to act on said load balance and adjustable to vary the effective ratio of said load balance, cooperating indicating members mounted independently of said load balance for movement with relation thereto, the position of one of said members being determined by said load balance, and a second unit receptacle arranged to act on said load balance at a fixed point with relation thereto.

20. In a scale, a beam a unit receptacle cooperating with said beam and movable lengthwise thereof, means mounted independently of said beam for indicating the ratio of said beam as determined by the position of said unit receptacle relative thereto, and a second unit receptacle associated with said beam and having a fixed relation thereto.

21. In a scale comprising a load balance, a unit receptacle arranged to act on said load balance and adjustable to vary the effective ratio of said load balance, and cooperating indicating members mounted independently of said load balance for movement with relation thereto, the position of one of said members being determined by said load balance.

In testimony whereof, I affix my signature hereto.

WILLIAM R. MITTENDORF.